United States Patent [19]

Riegler

[11] 4,075,736
[45] Feb. 28, 1978

[54] PROCESS AND APPARATUS FOR SHIRRING TUBULAR CASINGS

[75] Inventor: Ernst Riegler, Walluf, Germany

[73] Assignee: Hoechst Aktiengesellschaft, Germany

[21] Appl. No.: 445,982

[22] Filed: Feb. 26, 1974

[30] Foreign Application Priority Data

Feb. 27, 1973 Germany .............................. 2309721

[51] Int. Cl.² ............................................ A22C 13/00
[52] U.S. Cl. ......................................... 17/42; 17/49;
264/95; 264/282; 264/286; 264/310
[58] Field of Search ................. 264/95, 310, 285, 286, 264/282; 17/42, 49

[56] References Cited

U.S. PATENT DOCUMENTS

| | | | |
|---|---|---|---|
| 3,049,749 | 8/1962 | Mayer et al. | 17/42 |
| 3,096,546 | 7/1963 | Edwards | 264/285 |
| 3,310,833 | 3/1967 | Clement | 17/42 |
| 3,399,066 | 8/1968 | Ziolko | 17/49 |
| 3,461,484 | 8/1969 | Arnold | 17/42 |
| 3,581,338 | 6/1971 | Bender | 17/42 |
| 3,594,857 | 7/1971 | Michl | 17/49 |
| 3,805,330 | 4/1974 | Martinek | 264/95 |
| 4,001,914 | 1/1977 | Riegler et al. | 17/42 |

*Primary Examiner*—Jeffery R. Thurlow
*Attorney, Agent, or Firm*—James E. Bryan

[57] ABSTRACT

This invention relates to an improvement in the process for shirring cylindrical tubular casings, especially artificial sausage casings of synthetic material, in which an inflated casing is conveyed in the direction of its longitudinal axis and shirred, with pleating, against a counter-force by shirring forces acting upon the circumference of the casing, the improvement comprising that the forces acting upon the surface of the casing do so continuously and simultaneously, at equal intervals, at a plurality of points on at least two straight lines extending parallel to and symmetrically about the longitudinal axis of the casing, the action being at right angles to the longitudinal axis of the sausage casing, and circumferentially thereof, and, simultaneously, in the direction of the longitudinal axis of the casing, against said counter-force. The invention also relates to an apparatus for performing the process.

3 Claims, 1 Drawing Figure

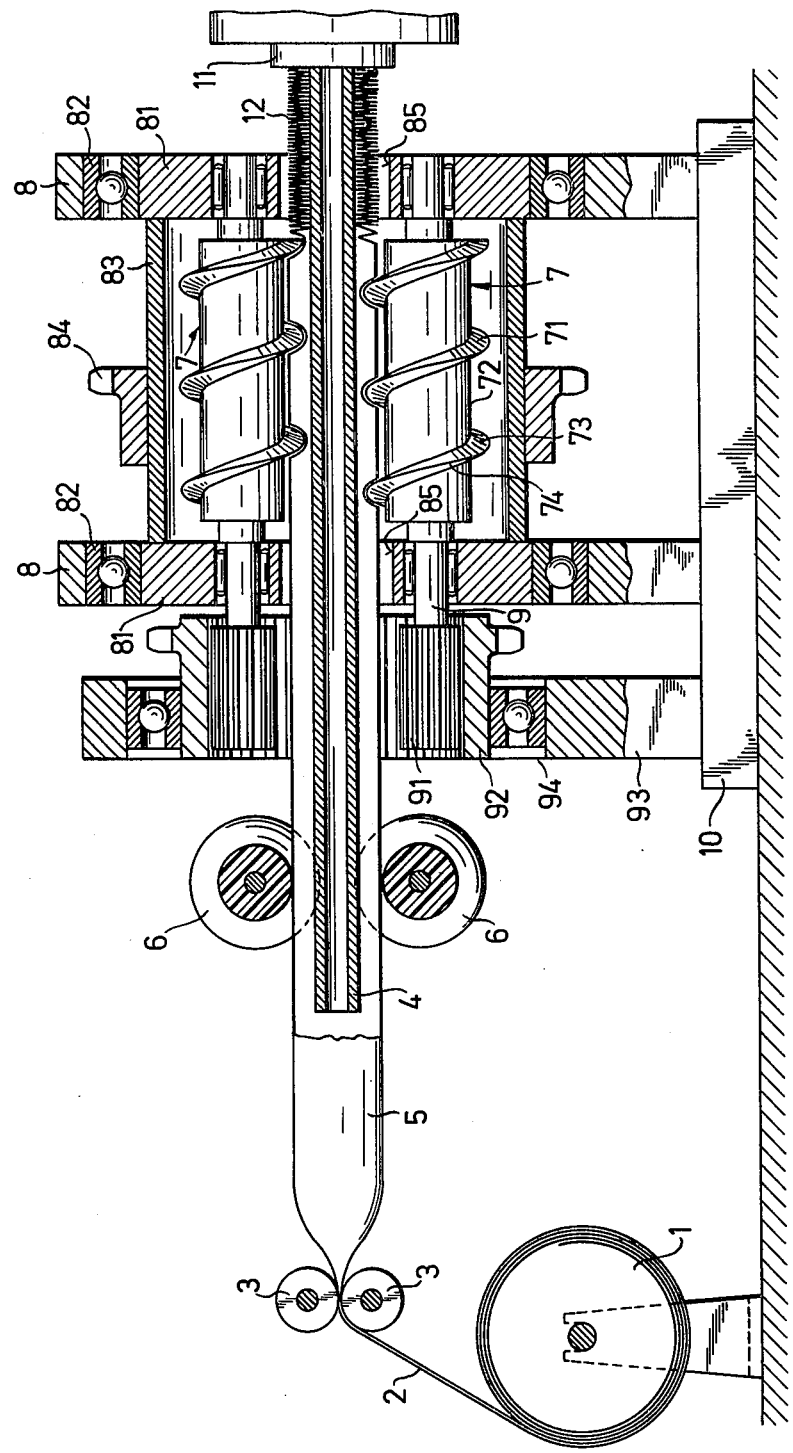

PROCESS AND APPARATUS FOR SHIRRING TUBULAR CASINGS

This invention relates to a process for shirring tubular casings of synthetic material and having a circular cross-section, especially casings made of regenerated cellulose.

Further, the invention relates to an apparatus for performing the shirring process.

Tubular casings of synthetic material, in particular of regenerated cellulose, are widely used as artificial sausage casings. In order to fill them with sausage meat by means of a sausage filler, the artificial sausage casings are normally used in the form of shirred casings, the so-called "sticks". The folded and shirred sausage casings forms a rigid, tubular hollow body.

When the sausage casing is to be filled with sausage meat, the stick is pushed onto the spout of a sausage filler of known type and the sausage meat is pressed through the spout into the stick, the other end of which is closed, so that the shirred sausage casing forming the stick is continuously unfolded.

Various processes and apparatuses for shirring sausage casings are known. According to one of these known processes, the sausage casing is inflated with air and slipped onto a mandrel provided with an abutment, where it is compressed and pushed together, with fold formation, by bringing the outer surface of the sausage casing positioned on the mandrel in frictional contact with the surface or surfaces of one or more driven rollers or cogwheels symmetrically arranged around the mandrel. Due to their rotational motion, in the direction of feed of the sausage casing only, the sausage casing is pushed against the abutment at the end of the mandrel and thereby pleated.

The known processes and apparatuses for shirring tubular casings have the disadvantage, however, that a satisfactory rigidity of the stick, which is required for further processing, can be achieved only by an additional, subsequent process step by which the stick is at least once further compressed to increase its compression rate.

Further, the known apparatuses have the disadvantage that for shirring sausage casings of different sizes, different shirring elements must be used, which are adapted to the different circumferences of the casings.

It is the object the present invention to overcome the disadvantages of the known processes and apparatuses and to enable the production of sufficiently rigid and substantially uniformly pleated sticks without the hitherto necessary re-pressing of the casings and without having to replace the shirring elements of the apparatus when different sizes of casings are to be shirred.

This object is achieved by a process for shirring cylindrical tubular casings, in particular artificial sausage casings of synthetic material, wherein the inflated casing is conveyed in the direction of its longitudinal axis and is shirred, with pleating, against a counter-force by means of a shirring element exerting shirring forces which act upon the circumference of the casing. In the process of the invention, the forces bearing upon the surface of the tubular casing act continuously and simultaneously, at equal intervals, upon a plurality of points lying on at least two straight lines which extend parallel to and symmetrical with the longitudinal axis of the casing, the action being at right angles to the longitudinal axis of the sausage casing and circumferentially thereof, and simultaneously, in the direction of the longitudinal axis of the casing, against a counter-force.

The shirring element may be, e.g., a straight, cylindrical bar, i.e., a worm shaft, upon whose surface an uninterrupted helically wound projection of constant height is arranged. This projection forms the teeth of the worm.

The teeth of the worm have two flanks and a ridge. Advantageously, the worms are of single-thread construction, but multiple-thread worms also may be used.

Cylindrical worms are preferred, but worms of conical construction also may be used. If conical worms are used, they should be arranged in such a manner that their longitudinal axes extend at acute angles to the longitudinal axis of the mandrel, and the worms should taper in the direction of the abutment at the end of the mandrel.

The distance between the teeth of the worm, i.e., the so-called "pitch", is either constant or differs from tooth to tooth. The height of the teeth must be selected such and the worms should be so arranged relative to the axis of the mandrel and to the sausage casing that, during shirring, the surfaces of the worm shaft and the tubular casing do not touch, while the teeth of the worm engage the sausage casing and depress it. The ridges of the teeth pass the surface of the shirring mandrel as closely as possible.

When the process is performed, the teeth of the rotating worm, by which the casing is depressed, exert the shirring force upon the casing.

In a particularly advantageous embodiment of the apparatus according to the invention, the shirring device comprises more than two, preferably three and, even more advantageously, four or eight rotating worm conveyors. The worms are arranged parallel to and symmetrically about the longitudinal axis of the mandrel. The worms are supported at both ends.

During performance of the inventive process, the casing to be shirred, which is inflated to its full diameter by a slight over-pressure, passes in known manner over the mandrel. With the aid of at least two worms whose longitudinal axes extend symmetrically to the longitudinal axis of the mandrel and whose teeth are in frictional contact with the inflated tube and depress it, the casing is gripped by the teeth due to the rotation of the worm and is conveyed to the abutment at the end of the mandrel, where it is pleated and compressed to form the stick. Advantageously, the shirring force is applied to the surface of the casing by means of three, and, even more preferably, by means of four or eight worms, the worms being arranged symmetrically about the longitudinal axis of the mandrel.

For the performance of the inventive process, all conveyor screws must rotate in the same direction, and all must be constructed in the same manner, i.e., all of them must be either left-handed or right-handed.

In the case of single-thread worms, the worms are preferably arranged around the mandrel in such a manner that the casing is consecutively gripped by the teeth of the worm along a helical line corresponding to the pitch of the worm. In this manner, the stick produced possesses an improved rigidity.

When the process of the invention is performed, the worms rotate about their longitudinal axis and, at the same time, revolve at a radial distance around the longitudinal axis of the mandrel, more precisely around the circumference of the inflated tubular casing.

This movement is such that each point on the longitudinal axis of the worm describes a circle with the axis of the mandrel as the center of the circle. The worms rotate in such a manner that, due to their rotational motion, the tubular casing is conveyed by the teeth of the worms towards the abutment of the mandrel and is simultaneously shirred.

The worms, which run in the same direction and rotate in the same direction about their longitudinal axes during the performance of the inventive process, are so supported that the bearings themselves are mounted on pivoting discs which are so arranged relative to each other and to the longitudinal axis of the mandrel that the worms revolve around a common center axis which coincides with the longitudinal axis of the mandrel.

Due to this arrangement, the worms are capable of rotating around their individual longitudinal axes as also, in a circular movement, about the longitudinal axis of the mandrel which forms their common center. Both rotary motions are simultaneously performed by the worms during the process of the invention.

Alternatively, it is possible for the worms to execute only a circular movement around the longitudinal axis of the mandrel.

By the combined rotary motion of all worms, the shirring forces applied to the tubular casing by the worm teeth act successively upon the entire circumference of the casing. Thus, the shirring forces do not act upon sections of the casing, but are evenly distributed over the entire circumference of the casing. In this manner, the rigidity of the stick is substantially increased.

The invention will be further illustrated by reference to the accompanying drawing, but it is not intended to limit it to the particular embodiment shown therein.

The drawing shows a diagrammatic side elevation, in section, of an apparatus according to the invention provided with four cylindrical worms as the shirring elements. The worms are mounted for rotation at each end and are arranged parallel to, and symmetrically about, the longitudinal axis of the mandrel. In the embodiment shown in the drawing, only two of a total of four worms are visible in the sectional view.

In the apparatus shown in the drawing, the tubular casing to be shirred is withdrawn from a supply roll 1, on which it is wound in the form of a collapsed tubular casing 2. The collapsed tube is then passed through the gap between two rotatable rollers 3.

The tube 5 is then slipped over the end of a hollow shirring mandrel 4 provided with an abutment 11 and conveyed to the worms 7 which serve as shirring elements. Through the opening of the hollow mandrel, air is blown into the tube 5 so that a slight over-pressure is created in the tube 5 and the tube 5 is inflated to its full diameter. Pivotally mounted driven rollers 6 are provided which are arranged symmetrically about the mandrel and serve to support and convey the tube.

In the drawing, 71 designates one of the teeth of the worm, 72 designates the cylindrical core of the worm, 73 designates the flank of a tooth, and 74 designates the ridge thereof.

The teeth of the worm engage the inflated tube in a manner such that they compress it, thus forming indentations.

Both ends of the worms 7 are mounted for rotation in identical discs 81 and may be driven, through the shaft 9 and pinions 91, by a drive wheel gear 92 constructed as an internally toothed sun wheel. For this purpose, the drive wheel gear 92, i.e., a chain wheel, is mounted in a bearing bracket 93 and an anti-friction bearing 94.

In the centers of the discs 81, circular openings 85 are provided whose diameter exceeds that of the fully inflated tube 5.

The discs 81 are so arranged that they are parallel to each other and occupy the same position relative to the worm.

The worms are arranged symmetrically about the circular openings 85 in the discs 81.

The bearing brackets 8 and the bearing bracket 93 are mounted on a base plate 10 which, in turn, is secured to a support (not shown).

In order that the worms 7 arranged symmetrically about the inflated tube 5 may be capable of executing a circular movement around the longitudinal axis of the mandrel as their common center axis — in addition to their rotary motion about their individual longitudinal axes — the discs 81 are mounted in bearing brackets 8 and anti-friction bearings 82, and the discs 81 are firmly attached to each other by an intermediate part 83. Secured to the intermediate part 83 is a drive wheel gear in the form of a chain wheel 84, by means of which the discs 81 and, thus, the worms 7 may be caused to rotate around a common central axis which corresponds to the longitudinal axis of the mandrel.

In this manner, two different rotary motions may be executed by two independent drive systems, so that the worms 7 rotate once about their individual longitudinal axes (the speed of this rotary motion primarily determining the shirring speed), and simultaneously execute a circular movement about the axis of the mandrel, i.e., around the circumference of the tube 5 which is being shirred.

Due to this movement, the teeth of the worms roll over the front side of the stick 12 and thus over the single folds, so that the teeth of the worms do not shirr or fold the tube in sections, but over the entire circumference of the front side of the stick.

The front side of the stick is the end of the stick remote from the abutment 11.

It will be obvious to those skilled in the art that many modifications may be made within the scope of the present invention without departing from the spirit thereof, and the invention includes all such modifications.

What is claimed is:

1. In the process for shirring cylindrical tubular casings, especially artificial sausage casings of synthetic material, in which an inflated casing is conveyed in the direction of its longitudinal axis and shirred, with pleating, against a counter-force by shirring forces acting upon the circumference of the casing, the improvement which comprises applying the shirring forces by at least two worm means, the longitudinal axes of which extend parallel to the longitudinal axis of the inflated casing and the teeth of which are in frictional contact with the inflated tube and depress it, said worm means rotating about their longitudinal axes and simultaneously revolving at a radial distance around the circumference of the inflated tubular casing.

2. A process according to claim 1 in which the shirring forces are applied by four worm means.

3. A process according to claim 1 in which the casing is successively contacted by the teeth of the worm means along a helical line corresponding to the pitch of the worm means.

* * * * *